United States Patent Office 3,409,477
Patented Nov. 5, 1968

3,409,477
WELDING FLUX COMPOSITIONS
Joseph M. Ash, Florence, Ky., assignor of one-third each to Frank Ash, Erlanger, and Harry K. Aurandt, Covington, Ky.
No Drawing. Filed Sept. 15, 1965, Ser. No. 487,591
1 Claim. (Cl. 148—23)

ABSTRACT OF THE DISCLOSURE

A general purpose brazing and welding flux composition comprising particular proportions of borax, boric acid, sodium bicarbonate, sodium chloride, ammonium chloride, agricultural lime, aluminum ammonium sulfate and potassium chloride, which flux is suitable for use with both ferrous and non-ferrous metals.

---

This invention relates generally to an improved welding and brazing flux composition and more particularly to a flux composition suitable for electric arc or flame welding of metals such as brass, steel, steel alloys, cast iron, aluminum, duralumin and the like.

It is well known in the art of welding and brazing that different metals require different conditions in the course of welding or brazing to insure a sound bond. Metals such as bronze alloys, steel alloys and cast iron require a carbonizing atmosphere while a metal such as steel requires a full neutral condition, i.e. non-oxidizing or carbonizing. Therefore, it is difficult for a relatively inexperienced welder to provide the correct conditions required at the site of the weld.

It is therefore a primary object of the present invention to provide a flux composition which provides suitable conditions at the site of the weld since the flux facilitates the correct gas shield to be formed at the site of the weld under somewhat less than ideal conditions.

Another object of the present invention is to provide a flux composition which inhibits metal oxidation during the welding or brazing process.

A further object of the present invention is to provide a novel flux composition which is particularly suited for the autogenous welding or brazing of a plurality of metals such as steel, brass, cast iron, aluminum and the like thereby making it unnecessary to utilize a different flux composition for each type of metal as generally done heretofore.

Still another object of the present invention is to provide a novel flux composition which facilitates the joining of similar and dissimilar metals by welding or brazing by retaining the molten materials in a compact mass thereby substantially precluding any spattering or popping of the molten metal thus effecting a better bond by substantially eliminating pitting.

Further objects will become apparent as the description proceeds.

To attain the above objects the flux composition of the present invention comprises the following chemicals intimately admixed in the approximate proportions as follows:

| | Parts |
|---|---|
| Borax | 8 |
| Boric acid | 4 |
| Sodium bicarbonate | 4 |
| Sodium chloride | 2 |
| Ammonium chloride | 1 |
| Agricultural lime (air-slaked lime) | 1 |
| Aluminum ammonium sulfate | 1 |
| Potassium chloride | 1 |

The above chemicals in powdered form are intimately admixed preferably in the order listed so as to substantially preclude the possibility of a neutralizing effect resulting from the mild reaction of the chemicals. The flux is somewhat hydroscopic and accordingly to insure that the composition remains in a particulate condition the composition should be protected from conditions of high humidity. As required, the composition may be moistened with a minor proportion of water to facilitate the application of the composition to a weld site as a paste or it may be utilized by merely plunging a pre-heated welding or brazing rod into the composition to cause the flux composition to adhere to the rod so as to deliver an adequate amount of flux to the weld site.

As the rod melts, or in the case of autogenous welding the molten metal puddles, the flux begins to cleanse the weld site providing the proper welding atmosphere, i.e. by the formation of a gaseous envelope at the weld site and at the same time retains the molten metal in a compact mass thereby substantially preventing spattering and popping of the molten metal thus effecting a better bond while substantially precluding pitting.

While it is not intended to be restricted by this analysis it is believed that the ammonium, sodium and potassium chloride serve to remove the impurities and any plating which may adhere to the metal at site of the weld. The boric acid improves the flow characteristics of non-ferrous metals being brazed and the sodium bicarbonate and aluminum ammonium sulfate in addition to neutralizing acids present also react to aid in the formation of a gaseous envelope to protect the weld site while the borax facilitates the penetration of the molten welding rod into the pores of the metals to be joined. The combined use of sodium bicarbonate and aluminum ammonium sulfate provides a gaseous envelope superior to that obtained by the use of sodium bicarbonate alone.

It has been found that the flux composition of the present invention greatly facilitates the joining of metals of both similar and dissimilar compositions without the necessity of resorting to the use of different fluxes for different metals or metal alloys.

It may therefore be seen that there has been provided an improved flux composition.

What is claimed as new is as follows:
1. A particulate flux composition for use in welding and brazing metals and their alloys which comprises an intimate admixture on the basis of weight of approximately 8 parts borax, approximately 4 parts boric acid, approximately 4 parts sodium bicarbonate, approximately 2 parts sodium chloride, approximately 1 part ammonium chloride, approximately 1 part agricultural lime, approximately 1 part aluminum ammonium sulfate and approximately 1 part potassium chloride.

References Cited

UNITED STATES PATENTS 1,844,969   2/1932   Meadowcroft _____ 148—23

L. DEWAYNE RUTLEDGE, *Primary Examiner.*

W. W. STALLARD, *Assistant Examiner.*